(12) United States Patent
Lamping et al.

(10) Patent No.: US 6,199,201 B1
(45) Date of Patent: *Mar. 6, 2001

(54) SOFTWARE CONSTRUCTS THAT FACILITATE PARTIAL EVALUATION OF SOURCE CODE

(75) Inventors: John O. Lamping, Los Altos; Michael D. Dixon; Gregor J. Kiczales, both of Palo Alto, all of CA (US); Brian C. Smith, Bloomington, IN (US)

(73) Assignee: Xerox Corporation, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/128,685

(22) Filed: Aug. 3, 1998

(51) Int. Cl.[7] .................................................. G06F 9/45
(52) U.S. Cl. ........................................................ 717/6
(58) Field of Search ................................ 717/4, 6, 9, 5, 717/8

(56) References Cited

U.S. PATENT DOCUMENTS

| | | | |
|---|---|---|---|
| 5,481,712 | * 1/1996 | Silver et al. | 717/1 |
| 5,535,392 | 7/1996 | Brett | 395/700 |
| 5,583,988 | 12/1996 | Crank et al. | 395/185.01 |
| 5,625,822 | 4/1997 | Brett | 395/705 |
| 5,632,033 | 5/1997 | Guillen et al. | 395/685 |
| 5,650,948 | * 7/1997 | Gafter | 364/578 |
| 5,664,172 | * 9/1997 | Antoshenkov | 707/4 |
| 5,666,296 | * 9/1997 | Gafter | 364/578 |
| 5,696,893 | * 12/1997 | Fromherz et al. | 395/112 |
| 5,831,853 | * 11/1999 | Bobrow et al. | 364/191 |
| 5,875,334 | * 2/1999 | Chow et al. | 717/5 |
| 5,937,192 | * 8/1999 | Martin | 717/5 |

OTHER PUBLICATIONS

The dissertation by Ruf, "Topics in Online Partial Evaluation," (Ph.D. Thesis Stanford University, 1993).
An annotation mechanism called "filters" is presented in the paper "New insights into partial evaluation: the Schism experiment," by C. Consel, presented at the European Symposium on Programming, 1988, and published as vol. 300 of Lecture Notes in Computer Science, pp. 236–246, by Springer–Verlag.
Title: From interpreting to compiling times, author: Consel et al, source: ESOP, 1990.*

* cited by examiner

Primary Examiner—Mark R. Powell
Assistant Examiner—Chameli C. Das
(74) Attorney, Agent, or Firm—R. Hutter

(57) ABSTRACT

A partial evaluator, or pre-compiler, for a computer program enables a user to provide, at suitable places within a program, language constructs which cause certain expressions within the program to be evaluated at runtime or at partial evaluation time. These language constructs can be used to shorten runtime, such as by avoiding unnecessary duplication of code at runtime.

9 Claims, 1 Drawing Sheet

SOFTWARE CONSTRUCTS THAT FACILITATE PARTIAL EVALUATION OF SOURCE CODE

FIELD OF THE INVENTION

The present invention relates to the technique of compiling software, particularly source code, according to the techniques known as "early evaluation" or "partial evaluation." More specifically, the present invention relates to novel software constructs that are superimposed on source code by a programmer to facilitate efficient partial evaluation.

BACKGROUND OF THE INVENTION

In computer science, there is a well-known basic dichotomy between whether a given quantity of code in a single program is executed at compilation time or at runtime. Whether individual steps in the code are executed at runtime or compilation time will have a significant effect on the overall efficiency of the code. Speaking very generally, to have certain operations occur at runtime makes for an appealingly simple code, but code that requires too many operations, such as table look-ups, at runtime will take orders of magnitude longer than an implementation which can perform some look-ups at compilation time. This is particularly true of library or middleware, that can be seen as providing a special-purpose language for doing certain kinds of operation (i.e., an image processing library can be seen as a special language for doing image processing). Most of the relative inefficiency comes from the inability of library code to make effective use of information available to users of the library; information that could be exploited at compilation time gets repeatedly rediscovered at runtime.

In order to overcome the problem of deciding whether the particular portions of a computer program should be executed at compilation time or runtime, one technique which has been developed recently is called "partial evaluation." An overview of partial evaluation can be found in the first three chapters of Ruf, "Topics in Online Partial Evaluation," (Ph.D. thesis, Stanford University, 1993). The Ruf dissertation basically describes an automatic program, called a "specializer," which operates in conjunction with a compiler: the specializer looks at codes submitted thereto, and makes an automatic inference, based on what information is known at a particular time, whether to "specialize" various portions of the program at partial evaluation time. Basically, if the specializer determines that it has enough information to specialize a particular input of the original program at partial evaluation time, and it judges that such specialization will be worthwhile, it does so. The overall output of the specializer is a new, specialized program which, when applied to any input satisfying the description, computes the same result as the original program. However, because the specialized program performed certain computations at partial evaluation time, the specialized program runs faster than the original program did.

Although a specializer as disclosed in the Ruf dissertation makes some progress in optimizing the execution of complicated programs, the practical applicability of partial evaluation has proven to be quite limited. It remains difficult to develop code that is highly efficient for purposes of partial evaluation, and all but impossible to make such code also easy to maintain.

The present invention takes an approach different from the attempt at total automation of partial evaluation, such as described in the Ruf dissertation. The present invention posits an arrangement whereby the programmer originating code has available to him certain software constructs which are read by a "partial evaluator," which is in effect a pre-compiler, which gives the programmer direct control over the execution time of different parts of the original program. The constructs of the present invention allow a programmer authoring a program to declare at individual call sites within the original program whether the code associated with a particular construct should be executed at runtime or at partial evaluation time.

DESCRIPTION OF THE PRIOR ART

In the prior art, U.S. Pat. No. 5,535,392 discloses a system for compiling a source program using what is called "smart" recompilation. Fragments of the source code are allowed to contain "invocation specific" information, which is generated during a coded generation phase of compilation. A hint generator attempts to preserve values of the invocation specific information between successive invocations of the compiler.

U.S. Pat. No. 5,583,988 discloses a method for performing runtime checking during program execution in a compiled environment. The invention detects a number of errors during runtime that cannot be found by a compiler at the precise moment that a respective C language restriction is violated. The invention provides the human user with a direct indication of the problem, thus saving debugging time. When source code is compiled, the invention allocates special data structures for every pointer, array, and structure object in the program. An association is made between each of these objects and its special data structure in a compiler symbol table. At runtime, these data structures contain status information about their associated objects.

U.S. Pat. No. 5,625,822 discloses a system for compiling a source program using "smart recompilation." Fragments of executable code are allowed to contain "invocation specific" information, which is generated during a code generation phase of compilation. A hint generator attempts to preserve values of the invocation specific information between successive invocations of the compiler. Generally, the technique includes generating a first global context table generated from a previous version of the source program, the first global context table being divided into a first group of fragments, and generating a second global context table from the source program to be recompiled, the second global context table being divided into a second group of fragments. A comparison function is used to search the sorted tables to identify fragments that may be equivalent.

U.S. Pat. No. 5,632,033 discloses a system for dynamic, runtime alteration of preset variable space relationships by a runtime GUI modification of object connections associated with the variable spaces. Arbitrary linkages between all variable spaces are established prior to runtime to allow initial conditions for variable resolution irrespective of anticipated or actual object connections. Thus, all variables associated with objects are prespecified and provided with initial values, so long as a value has been assigned to the variable in some object. When actual object relationships are indicated at runtime, these effect new variable space linkages. The initial and subsequent linkages are effected with pointer addresses within the respective variable spaces.

The dissertation by Ruf, "Topics in Online Partial Evaluation," (Ph.D. Thesis Stanford University, 1993) has been described in detail above.

An annotation mechanism called "filters" is presented in the paper "New insights into partial evaluation: the Schism experiment," by C. Consel, presented at the European Symposium on Programming, 1988, and published as volume 300 of Lecture Notes in Computer Science, pages 236–246, by Springer-Verlag. The filter mechanism allows a programmer to annotate a procedure to indicate under what circumstances it should be specialized and what arguments should be used to specialize the function.

SUMMARY OF THE INVENTION

According to one aspect of the present invention, there is provided a method of processing a computer program, the program having a procedure therein. There is provided in the program a language construct that specifies that a specialization of the procedure should be created at a point of use of the procedure.

According to another aspect of the present invention, there is provided a method of processing a computer program. There is provided in the program a language construct that specifies that a computation associated with the language construct should be carried out before the program is run. The program is submitted to a partial evaluator before the program is compiled. The partial evaluator returns an error if any computation in an expression having the language construct associated therewith cannot be done by the partial evaluator.

According to another aspect of the present invention, there is provided a method of processing a computer program, comprising submitting an expression in the program to a partial evaluator. If the partial evaluator determines a value which can be substituted for the expression without changing the result of the program, the partial evaluator returns to the program a first language construct, and otherwise returns to the program a second language construct.

According to another aspect of the present invention, there is provided a method of processing a computer program defining therein a specific procedure. An expression in the program is submitted to a partial evaluator. If the partial evaluator determines the expression is the result of invoking the specific procedure, the partial evaluator returns to the program a first language construct, and otherwise returns to the program a second language construct.

According to another aspect of the present invention, there is provided a method of processing a computer program, comprising the steps of identifying a part of the program, having a procedure definition therein, that is known to require execution at run time. The program is submitted to a partial evaluator before the program is compiled. There is provided in the program a language construct that causes the partial evaluator to override the value of the procedure definition throughout the identify part of the program.

DETAILED DESCRIPTION OF THE INVENTION

Figure 1:
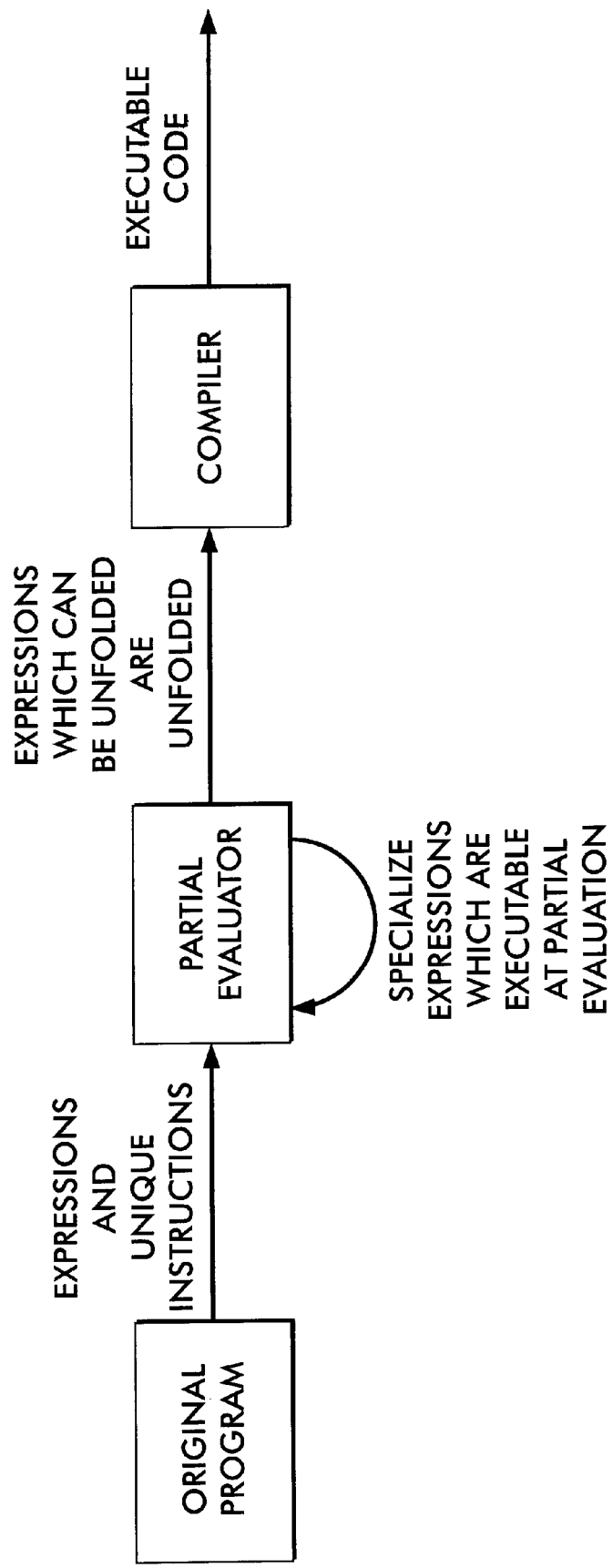
FIG. 1 provides a simple overview of the use of a partial evaluator according to the present invention.

FIG. 1 is a diagram showing the relationship of various computer elements providing the context of the present invention. A programmer creates an original program, this program containing various quantities of source code. For present purposes this code can be in any programming language familiar in the art. The program is, according to the present invention, first submitted to what is herecalled a partial evaluator. As will be described in detail below, the purpose of this partial evaluator is to detect and respond to certain unique language constructs, or instructions, which have been provided to the original program by the programmer. Generally, a program to be partially evaluated, compiled, and run can be considered a set of "expressions," and the unique instructions according to the present invention are each associated with one or more expressions in a program. As shown in the Figure, and as will be explained in detail below, according to various aspects of the present invention, the program includes unique instructions by which the programmer can instruct the partial evaluator to specialize, or unfold, certain expressions for more efficient compiling.

The partial evaluator responds to the unique instructions of the present invention generally by specializing those expressions in the original program which have been identified as being executable at partial evaluation time. The output of the partial evaluator is essentially the same program which was submitted thereto by the programmer, with the exception that expressions of the original program which could be unfolded at partial evaluation time have been unfolded. This modified program can then be sent to a standard compiler, which compiles the modified program, outputting executable code, which is then executed in a manner which may, for example, require look-ups from a database.

With the present invention, there are two distinct things being controlled: (1) whether to do a computation at partial evaluation time or at runtime, and (2) whether to duplicate code during compilation. (The Ruf dissertation calls the first a reduce/residualize decision and a second a specialization decision.) The two decisions are related in that the more specialization is done, the more computation can be done at partial evaluation time. In general, doing computation at partial evaluation time is good, because it is faster, but doing specialization at partial evaluation time is bad because it increases code size.

The partial evaluator is shown as a separate element from the compiler, which in this example is a standard prior-art compiler. It will be apparent, however, that the partial evaluator could be in effect embedded in the code forming the compiler so that the partial evaluator is in effect a special function of the compiler. However, for purposes of clear explanation, the partial evaluator shall be deemed a conceptually separate element from the compiler.

The unique instructions which are essential to the present invention are placed at specific locations within a program created by the programmer, and instruct the partial evaluator to specialize the particular expressions associated with the instructions in specific ways at partial evaluation time. These software constructs shall be defined as follows, with the understanding that the particular selected names for these unique instructions are arbitrary for purposes of this disclosure, and the claims below are directed to the underlying methods performed by the partial evaluator:

INSTANTIATE PER REFERENCE:

This command is used when a procedure (or message, in the object-oriented programming context) is defined. This command indicates to the partial evaluator that, for every reference to the defined procedure, the partial evaluator is authorized to compile a special version of the procedure that can take advantage of what is known when the call site of the program is reached at partial evaluation time. In other words, this instruction allows the user to specify whether a procedure associated with the command should be specialized when the procedure is defined or specialized at a point of use of the procedure.

COMPUTE STATICALLY:

This commanded instructs the partial evaluator to execute an expression associated with this command at partial evaluation time, or, more generally, before runtime. These executions will be typically in the form of message calls or arithmetic functions. If, during compilation time, it turns out that certain information needed to execute the code is not available, code associated with this command will cause the partial evaluator to give a compile-time warning message, or in other words return an error, to the programmer.

COMPUTE AGGRESSIVELY:

When this command is associated with certain code in the program, the command is read by the partial evaluator as indicating that the associated code is not required to be executed at partial evaluation time. This command effectively "turns off" a previous compute statically command.

It will be seen, from the above descriptions of the software commands, that COMPUTE STATICALLY acts as a tool which can be used by the programmer to instruct the compiler to execute particular portions of the program at partial evaluation time. If the compiler, because of the structure of the program, cannot perform this compile-time execution, the compiler sends a warning to the programmer. As a practical matter, a programmer can only successfully implement a COMPUTE STATICALLY command in the original program when he associates the command with an expression he will know in advance has all the arguments thereof known at partial evaluation time.

One tool for ensuring that the necessary arguments are known, or "actual," at partial evaluation time is to use the INSTANTIATE PER REFERENCE instruction. The INSTANTIATE PER REFERENCE instruction is used when procedures are defined or called within the program. If a particular defined procedure is associated with INSTANTIATE PER REFERENCE, the partial evaluator will cause the compiler to make a new copy of the procedure body, with actual procedure arguments therein, every time the defined procedure is called. If the defined procedure is not associated with INSTANTIATE PER REFERENCE, the partial evaluator will, whenever the procedure is called, use the same standard copy of the procedure, without actual arguments therein, every time the procedure is called. In the basic case, if the "standard" copy of the procedure body is repeatedly used, this standard copy not having actual arguments therein, there will be an operation such as a table look-up required every time the procedure is called when the code is eventually compiled; in contrast, if INSTANTIATE PER REFERENCE is used, a new copy of the procedure body, with actual arguments therein, will be inserted into the modified program and no table look-up will be required at runtime. Because no table look-up is required for the procedure call at runtime, the execution of the program at runtime is made that much shorter.

An example of the implementation of these software constructs is given below. Consider the following code, written in Scheme, being used to define a procedure called "send":

```
(define send
  (lambda (message-name obj . args)
    (let* ((message (find-message obj message-name))
           (offset (message-offset message)))
      (check-send-args message args) ;check number and type of args
      (apply (aref (obj-methods obj) offset) obj args))))
```

The function of this code is to look up a message descriptor from the message name, find out which position in the method vector holds the method body, check that the arguments therein are of the correct types, grab the method code, and then call the method code. While this code is very simple, and corresponds neatly to the individual steps required to carry out the procedure "send," this code is extremely impractical. The code is basically interpreter code that happens to use compiler-like data structures, in that all of the functions described therein are intended to be executed at runtime. Thus, the code as written above involves several runtime table look-ups, which will take orders of magnitude longer than an equivalent set of code which performs look-ups at partial evaluation time.

In particular, with regard to the above code, the following operations could be performed at partial evaluation time: finding the message descriptor, finding its offset in the method table and checking the types of the arguments. All that must be delayed until runtime is the last line of the procedure, the basic object dispatch. It would preferable to modify the code, such as with the software constructs of the present invention, so that the operations commanded by the code could be performed at partial evaluation time where ever possible.

Here is the same code as above, incorporating the partial evaluation instructions of the present invention:

```
(define send
  (instantiate per-reference
    (lambda (message-name obj . args)
      (compute statistically
        (let* ((message (find-message obj message-name))
               (offset (message-offset message)))
          (check-send-args message args) ;check number and type of args
          (compute aggressively
            (apply (aref (obj-methods obj) offset) obj args)))))))
```

This is exactly the same code as above, except for the addition of commands corresponding to the software constructs of the present invention. INSTANTIATE PER REFERENCE says this definition of "send" should be grouped once per reference to the defined operation. In other words, assuming a first order language, this definition will be grouped once per call site in the program submitted by the programmer. The effect is thus similar to that of the "inline" programs of several programming languages. The procedure will be compiled once for each group, using whatever information is available at partial evaluation time about the calls in that group.

COMPUTE STATICALLY instructs the partial evaluator that the code following it is expected to be executed at partial evaluation time, once per group. A partial evaluation time error will result if that is not possible. Once again, the programmer must be careful to associate this instruction only with an expression he knows will be executable at partial evaluation time; i.e., the programmer must know in advance that enough information will be available at partial evaluation time in order to execute the code to some extent. In the present case, because of the previous INSTANTIATE PER REFERENCE, the actual argument (that is, the fixed variable name) of the argument "message-name" will be known by the time the COMPUTE STATICALLY is reached. Because the variable message-name will be filled in, the three lines of code following COMPUTE STATICALLY in the above example will be executable at partial evaluation time. If for some reason message-name was not known, the compiler would respond with an error message to the programmer.

COMPUTE AGGRESSIVELY, in this context, is basically an override of the previous COMPUTE STATICALLY command, saying that the expressions following it are not required to be executed at partial evaluation time. In the present example, this command is essentially reserved for the last line of the code, which as mentioned above is the only line of the code which absolutely must be executed at runtime.

The overall effect of using the basic instructions of the present invention is that a programmer is allowed to use the essentially intuitive programming style in the first example of code, but can then make the compiling and execution of the intuitive code more efficient by superimposing the software constructs thereon, thus controlling whether various portions of the code are executed at runtime or partial evaluation time. Basically, if possible, it is almost always more desirable to have code executed at partial evaluation time, if only to avoid the situation in which information that could be exploited at partial evaluation time has to be repeatedly "rediscovered" at runtime.

In addition to the basic instructions used by a programmer with the partial evaluator of the present invention, there exists, according to a preferred embodiment of the present invention, constructs which allow interaction between what is known statically and the way a computation is carried out. These additional instructions allow true programmability in terms of static information, and allow the way a result is computed to be adjusted to reflect when certain information is known. In order to provide a fully general way of giving control over the way a result is computed, the instructions allow choice among different computations, depending on how much is known statically.

More specifically, according to the present embodiment, there are provided three such conditionalizing instructions: KNOWN-VALUE, STATIC OVERRIDE, and KNOWN-CASE. All three of these "static knowledge" instructions can be used to cause the partial evaluator to return a first sub-expression, if a predetermined quantity of information associated with the instruction is known at partial evaluation time, and causing the partial evaluator to return a second sub-expression, if the predetermined quantity of information associated with the expression is not known at partial evaluation time.

The instruction KNOWN-VALUE? is the basic form for determining whether a value associated with an expression is known statically. Although the details of the KNOWN-VALUE instruction will be discussed in detail below, in brief, and with particular reference to the claims, the essential function of the KNOWN-VALUE instruction associated with a particular expression is to cause the partial evaluator to return a "true" flag if the expression can be reduced to a constant at partial evaluation time, and to return a false flag if the expression cannot be reduced to a constant at partial evaluation time. The true or false flag replaces the expression in the partially-evaluated code.

KNOWN-VALUE, expressed in context as (known-value? <expr>), returns true if the value of the expression associated therewith is known statically. For example (known-value? 1)

(known-value? (+1 2))

(let ((x (+1 2)))

(known-value? x))

will all produce #t (true) as residual code. While (known-value? y)

(known-value? (+1 y))

will all produce #f (false) as residual code, assuming that the value of y is not known statically.

The known-value? construct, itself, is always executed at compile time, since it is querying what is known at compile time. Thus (known-value? (known-value? <expr>))

will produce #t as residual code, no matter what <expr> is.

A major use of the known-value? construct is to control inlining and specialization. For example,

```
(letrec ((f1 (lambda (n acc)
        (if (= n 0)
            acc
            (f (- n 1)(* n acc))))
    (f (instantiate per-reference (lambda (n acc)
            (if (known-value? n)
                ((instantiate per-reference f1) n acc)
                (f1 n acc))))))
  (+ (f y 1)
     (f 3 y)))
will produce
(letrec ((f1 (lambda (n acc)
        (if (= n 0)
            acc
            (f1 (- n 1) (* n acc))))))
  (+ (f1 y 1)
     (* 3(* 2(* 1 y)))))
``` as residual code, assuming that the value of y is unknown. The known-value? construct ensures that unfolding only happens when the value of n is known. There is an important pattern here, of an instanitiate-per-reference function that will be executed essentially statically to check to see how much is known and then So far, there has be no precise definition of a value being known statically. The exact behavior of the known-value? construct depends, of course, on what it means for a value to be known statically. For simple constants, like numbers, it is clear what is intended, but it is less clear for structured values or for values that are functions. The precise definition is: An expression has a statically known value if the partial evaluator determines, at compile time, a value of the language which can be substituted for the expression without changing the result of the program (except via changing the result of constructions like known-value?). Furthermore, a variable that has been indicated as statically known by known-value? must be consistently treated as statically known. If it refers to an immutable value, then all references to the variables must be treated as static; while if it refers to a mutable value, then all temporally subsequent references must be treated as static. To provide examples of this definition in action, if an expression reduces to a number, it is a known value. A pair that does not support side-effects is a known value if each component is a known value. For example, if the expression make-immutable-pair produces immutable pairs, then (known-value? (make-immutable-pair 1 2))

must produce #t as its residual code. It does not matter if it is not known where the pair was constructed. For example, the known-value? in

```
(let ((x (make-immutable-pair 1 2))
      (z (make-immutable-pair 1 2)))
    (let ((p (if y x z)))
      ...
      (known-value? p)
      ...))
``` is allowed to return true. The answer is not required to return true in this case, since the partial evaluator is not required to realize that the result of the dynamic conditional could be expressed as a static value. But since all references to p could be replaced by a reference to a statically computed (make-im-mutable-pair 1 2), the partial evaluator is allowed to indicate that it made that inference, as long as it is consistent about whether or not p is static.

If part of a pair is not used, the definition means that the partial evaluator is allowed to report that the pair as known statically even if that part of the pair is not known. For example, the known-value? in (let ((x (make-immutable-pair 1 y))

. . .

(known-value? x)

. . .

is allowed to return true if the second element of x is never accessed, even if the value of y is not known, because that would mean that all references to x could be replaced by references to a statically computed (make-immutable-pair 1 423), for example. Again, the partial evaluator is not required to make this inference, but it has the option.

Another instruction that may be associated with an expression, KNOWN-CASE, causes the partial evaluator to determine if, at partial evaluation time, the value of a test expression resulted from a kind of computation in a predetermined pattern. If so, the partial evaluator will return the value of the true case expression, and, if not, return the value of the false case expression.

A KNOWN-CASE instruction is expressed in the form (known-case <expr> (<fun> <var1> . . . <varn>) <true-case-expr> <false-case-expr>). It tests, at partial evaluation time, whether the partial evaluator has simplified the value of <expr> to a call to the function <fun> with the specified number of arguments. If so, then the value of the known-case is the value <true-case-expr>, which is evaluated in a context where <var1> through <varn> are bound to the arguments to <fun>. Otherwise, the value of the known-case is the value of <false-case-expr>.

While the KNOWN VALUE and KNOWN CASE constructs are used to find out how much is known statically, STATIC OVERRIDE, expressed in the form of (static-override (<var> <expr>) <body>) and (accept <expr>), is used to inform the system about static information that it might not otherwise know about. For example:

```
(if (eqv? (car x) 3)
    (static-override (car (lambda (pair)
        (if (eqv? pair x)
            (accept 3))))
        ((instantiate-per-reference foo) x)))
```

What is going on here is that the value of the car of x is 3 in the true branch of the if (assuming no side-effects). We would like foo's uses of the car applied to x to be replaced by 3, which is what the static-override accomplishes.

The static-override construct takes a variable, an expression, and a body, and runs the body in a modified environment, returning its result. This construct does not bind the variable; it must already be bound. Rather, it gives an alternative (but presumably equivalent) value for it that is appropriate when control is inside the body of the construct.

As illustrated in the example, the alternative definition is, in general, conditional. This is achieved by requiring one or more accept constructs to appear in the definition of the alternative value. The override only takes place at an applicable location if the expression for the alternative value can statically reduce to an accept construct, in which case the expression in the accept construct indicates the value to be used. If the expression for the alternative value cannot statically reduce to an accept construct, then the static override has no effect. It is always legal for the partial evaluator to inline the alternative value for a static-override. It is as if the alternative value was wrapped in an instantiate-per-reference construct.

Like the standard fluid-let construct of Scheme, the static-override construct respects lexical scope in that it will only affect references to the same lexical variable as the one that it overrides. If foo, for example defined its own local variable named car, references to that variable would not be affected.

The partial evaluator is only required to consider the alternative value for those references that it can statically determine as being inside the dynamic extent of the static-override construct. In the above example, all references to car in foo will be considered, since foo is inlined so that its references are statically visible as being inside the dynamic extent of the body. Even closures constructed inside foo are affected, since the alternative version of car is closed over. But if foo calls some other function, which is not inlined or executed statically, then references to car inside that function are not affected (unless the partial evaluator determines that the function is only called from dynamically inside foo).

The amount of staticness the partial evaluator is able to infer can affect the applicability of a static-override. To prevent the result of the program from being affected by the amount of staticness inferred, the alternative value given by the construct should be equivalent to the value it overrides, as far as it affects the result that will be computed by the program. Presumably, the alternative value will be superior in some other way, such as performance or staticness.

Here is an example that emphasizes the dynamic properties of static-override.

```
(static override (baz (lambda (z) (accept (bar z))))
    (static-override (bar (lambda (x) (accept (foo x))))
        (baz y)))
will produce
(foo y)
``` as residual code. The call to baz gets replaced by a call to bar, which is now visibly inside the dynamic scope of the inner static-override, which means that it gets replaced by a call to foo.

In the following discussion, the functionality of the above unique instructions which can be associated by a programmer with expressions, according to the present invention will be described from the perspective of the partial evaluator itself, that is, the below discussion will focus on how the partial evaluator according to the present invention reacts to expressions being associated with particular expressions in a program being evaluated, compiled, and run. As part of this description, there is first provided an overview of the preferred overall structure of "closures" which are used by the partial evaluator; followed by a recursion, which is in effect a flowchart describing the reaction of the partial evaluator to different expressions which are associated with instructions, such as described above. Finally, as an appendix, the recursion is rendered in LISP, which thus forms an embodiment of a partial evaluator which carries out the method of the present invention.

OVERVIEW

Here is described the basic structure of a partial evaluator embodying the invention for a purely functional subset of Scheme. It takes an expression and a context and returns an equivalent expression, where all static computations have been performed. Actual code for the partial evaluator is also appended, and includes some details left out of this less formal description. It should be consulted in case of any question.

The partial evaluator is structured as a purely functional recursive interpreter, which, in addition to the expression, takes an additional context argument, consisting of three components:

The lexical environment maps each bound variable to a closure.

The override environment maps identifiers to sequences of alternate implementations.

The static indicator specifies whether all computation must be done at partial evaluation time.

When initially partial evaluating a top level expression, the lexical environment typically contains entries only for pre-defined primitives, the override environment is empty, and the static indicator is false.

The partial evaluator actually returns closures, not just expressions. Closures serve several purposes. Some closures fulfill the traditional role of recording a lexical environment. These closures contain lambda expressions that have not been partial evaluated yet, and they record the entire evaluation context. More commonly, closures contain expressions that have been partially evaluated and contain no more references to lexical variables, but may contain references to other closures. This available closure list records all other closures referred to by the expression of the closure that are not available in the context where the closure is currently being processed. This reference list is thus built up as a closure is passed up through lexical contexts.

A closure also provides several ways of describing its value. To handle the known-case form, the partial evaluator may have to take apart the computation that gives rise to a value. But in other cases, it will just have to insert a reference to the value. So a closure records both a name for its value, the unique identifier, and an expression for how the value is computed. While both are always available, a closure distinguishes between whether it stands for the actual computation of its value or just a reference to that value. This is recorded in the local expression flag, which is true if the closure stands for the actual computation.

Finally, a closure also records other information about its context and history: whether its computation must be done at partial evaluation time, the may not residualize flag, and whether its expression has been authorized to be copied, the per reference flag.

To fully partial evaluate an expression, the partial evaluator is invoked in a context consisting of the initial lexical environment and an empty override environment. Then the resulting closure is converted to an expression (see note 3). (The conversion to an expression may invoke more partial evaluation.)

OUTLINE OF PARTIAL EVALUATION RECURSION

To partial evaluate an expression in a context, dispatch on what type of expression it is:

A constant: return a closure containing the constant as its expression, the local expression flag set, and a new unique identifier.

A primitive operation: partial evaluate each of the primitive's operands in the context. Return a closure consisting of:

If the operands all resulted in closures consisting of constants, the result of the operation on those constants.

Otherwise, if the primitive is "equal?" and the operands both evaluated to identical closures, then return #t.

Otherwise, return a primitive operation, consisting of the primitive operating on the partially evaluated operands.

A lambda expression: Package the expression in a closure, along with the current context.

An application: partial evaluate the function and each of the arguments in the context.

If the function partial evaluated to a closure with a unique identifier, go through each alternative recorded in the override environment for that unique identifier, and apply the alternative lambda expression to the partially evaluated arguments (see note 4). For the first one that results in a closure over an "accept" expression, if any, return the same closure, but over the body of the accept expression. If no override succeeded, but the function partial evaluated to a closure over a lambda expression, and the closure has a "local expression" or "per-reference" flag, then apply the partially evaluated function to the partially evaluated arguments (see note 2).

Otherwise, with shared values consisting of the partially evaluated arguments (see note 1), return a closure over an expression, consisting of the partially evaluated function applied to the partially evaluated arguments.

A variable: lookup the variable in the lexical environment.

If it is bound, return the closure from the environment. Otherwise return a closure consisting of just the variable.

An instantiate-per-reference: partial evaluate the body of the per-reference in the context, and return the resulting closure, but with the "per-reference" added.

A compute-statically: partial evaluate the body of the compute-statically in the context with the static indicator set to true, and return the result.

A compute-aggressively: partial evaluate the body of the compute-aggressively in the context with the static indicator set to false, and return the result.

A known-value?: partial evaluate the body of the compute-statically in the context with the static indicator set to false. If it results a constant, or a closure over a lambda, return a closure consisting of the constant #t. Otherwise return a closure consisting of the constant #f.

A known-case: Lookup the name of the function of the case expression in the lexical environment, and note the unique identifier. Partial evaluate the test value with the static indicator set to false. If the result's expression is an application of the unique identifier to the correct number of arguments, return the result of partial evaluating the true case expression, with shared values consisting of the argument closures from the application (see note 1) and with available closures of the result closure (see note 3) in the context with the lexical environment extended with each of the case expression's variables bound to the corresponding argument closure. Otherwise, return the result of partial evaluating the false case expression.

A static-override: lookup the variable in the lexical environment. If there is no binding, fail with an error that unbound variables cannot be overridden. Otherwise, partial evaluate the value in the context to get a result closure. Extend the override environment with a binding of the unique identifier from the variable lookup to the result closure, with the "per-reference" flag set. Partial evaluate the body, with available closures consisting of the result closure, (see note 2) in that environment, and return the result.

13

An accept: Partial evaluate the body in the context, return the same closure, but with the expression wrapped in an accept expression.

SUBROUTINES

Note 1: To do a computation with shared values: Clear the local expression flags and required contexts of the closures and call the computation with the resulting closures. Make the original closures available in the resulting closure.

Note 2: to make closures available to a closure: Add all of the closures and any of their required closures that have the local expression flag set to the required closures of the original closure, removing any required closures of the added closures.

Note 3: to convert a closure to an expression: Compute an initial expression: If the closure does not have the "local expression" flag and is not per reference use its unique identifier. Otherwise, if its expression is not a lambda expression, use that. Otherwise, take the context out of the closure, set the static indicator to false and extend the lexical environment with bindings for all the arguments of the lambda expression to closures with undefined expressions and new unique identifiers. Partial evaluate the body of the lambda in the new context, and make a lambda expression with the result as its body. Once the initial expression has been computed, convert any of its subcdosures to expressions. Then, for each of the available closures of the original closure whose unique identifiers occur free in the resulting expression, wrap the expression in a let expression binding the identifier to available closure, itself converted to an expression.

Note 4: To apply a closure over a lambda to closures of arguments: Partial evaluate the body of the lambda with shared values (see note 1) consisting of the arguments and the available closures of the lambda closure available (see note 2) and in the context with the lexical environment augmented with each of the formal argument variables of the lambda bound to the corresponding argument closure.

Below is reproduced, as an appendix, a usable LISP version of the above recursion.

While the invention has been described with reference to the structure disclosed, it is not confined to the details set forth, but is intended to cover such modifications or changes as may come within the scope of the following claims.

APPENDIX

```
;;; Here is an example that uses most of the constructs. It defines
plus
;;; to do addition and be inlined. It then defines an override for plus
;;; that checks to see if the first argument is known to be 0, in which
;;; case, it reduces to just the second argument.
(quote
  (fully-pe '(let ((plus (instantiate-per-reference (lambda (x y) (+ x y))))))
    (let ((f (lambda ( )
              (plus
                (plus 0 z)
                (plus 1 z)))))
      (static-override      (plus (lambda (x y)
                                    (compute-statically
                                      (if (known-value? x)
                                        (if (= x 0)
                                          (accept y)
                                          nil)
                                        nil))))
        ((instantiate-per-reference f))))))
)
;;; It returns
;;; (LET ((#:G1759 1))
;;;   (LET ((#:G1779 (+ #:G1759 Z)))
;;;     (+ Z #:G1779)))
```

14

APPENDIX-continued

```
;;; which is a name converted version of (+ z (+ 1 z)), where the one
plus
;;; has been simplified, and the rest inlined.
;;; Here is an example that also uses known-case. It defines a
constructor,
;;; pair, and two deconstructors, left and right. It defines overrides
for
;;; the deconstructors that do the deconstruction at pe time if their
;;; argument is known to be a call to the constructor. Then it defines
a
;;; function, f, that takes a pair and adds its pieces. It then defines
an
;;; override for f. The override first defines a two argument function
;;; that does the same thing as f, but takes two arguments, rather than
the
;;; pair. The override then says to use the two argument version in
place
;;; of any call to f where the arguments are known to be a pair.
Finally,
;;; f is called on a pair.
(quote
 (fully-pe      '(let ((pair (lambda (x y) (cons x y)))
                       (left (lambda (x) (car x)))
                       (right (lambda (x) (cdr x))))
                  (static-override
                    (left (lambda (x) (known-case x (pair u v)
                                        (accept u)
                                        nil)))
                  (static-override
                    (right (lambda (x) (known-case x (pair u v)
                                        (accept v)
                                        nil)))
                  (let ((f (lambda (x) (+ (left x) (right x)))))
                    (static-override
                      (f (let ((two-arg-f (lambda (u v)
                                            ((instantiate-per-reference f)
                                             (pair u v)))))
                           (lambda (x)
                             (known-case x (pair u v)
                               (accept (two-arg-f u v))
                               nil))))
                      (f (pair 1 2))))))))
)
;;; It returns
;;; (LET ((#:G5499 1))
;;;   (LET ((#:G5500 2))
;;;     (LET ((#:G5481 (LAMBDA (#:G5546 #:G5547) (+ #:G5546
#:G5547))))
;;;       (#:G5481 #:G5499 #:G5500))))
;;; which is a name converted version of
;;; (let ((two-arg-f (lambda (u v) (+ u v))))
;;;   (two-arg-f 1 2))
;;; where the call to f has been replaced by a call to two-arg-f, and
the
;;; definition of two-arg-f has its deconstructors eliminated.
;;; --------------------- Language Definition -------------------------
---
(defconstant *keywords* ' (lambda
                           if
                           instantiate-per-reference
                           compute-statically
                           compute-aggressively
                           known-value?
                           known-case
                           static-override
                           accept))
;;; Constants
(defun constant-expression? (expression)
  (or (numberp expression)
      (eq expression *true*)
      (eq expression *false*)))
(defconstant *true* t)
(defconstant *false* nil)
;;; Primops are the primitive data operations of the language.
;;; (<primop-operator> . <primop-arguments>)
(defun primop-expression? (expression)
  (and (listp expression)
       (member (first expression) *primops*)))
(defun make-primop (primop arguments)
```

APPENDIX-continued

```
        (cons primop arguments))
(defun primop-operator (expression) (first expression))
(defun primop-arguments (expression) (rest expression))
(defconstant *primops* ' (+
                          -
                          *
                          /
                          >
                          <
                          =
                          cons
                          car
                          cdr
                          equal))
(defun apply-primitive (operator arguments)
    (apply (ecase operator
              (+ #'+)
              (- #'-)
              (* ##'*)
              (/ #'/)
              (> #'>)
              (< #'<)
              (= #'=)
              (cons #'cons)
              (car #'car)
              (cdr #'cdr)
              (equal #'equal))
           arguments))
;;; Lambdas define functions.
;;; (lambda <lambda-formals> <lambda-body>)
(defun lambda-expression? (expression)
    (and (listp expression)
         (= (length expression) 3)
         (eq (car expression) 'lambda)
         (listp (second expression))
         (every #'symbolp (second expression))))
(defun make-lambda (formals body)
    (list 'lambda formals body))
(defun lambda-formals (expression) (second expression))
(defun lambda-body (expression) (third expression))
;;; Applications
;;; (<application-function> . <application-arguments>)
(defun application-expression? (expression)
    (and (listp expression)
         (not (primop-expression? expression))
         (not (member (first expression) *keywords*))))
(defun make-application (function arguments)
    (cons function arguments))
(defun application-function (expression) (first expression))
(defun application-arguments (expression) (rest expression))
;;; Variables
(defun variable-expression? (expression) (symbolp expression))
;;; Ifs define conditionals
;;; (if <if-test> <if-true-case> <if-false-case>)
(defun if-expression? (expression)
    (and (listp expression)
         (= (length expression) 4)
         (eq (first expression) 'if)))
(defun make-if (test true false)
    (list 'if test true false))
(defun if-test (expression) (second expression))
(defun if-true-case (expression) (third expression))
(defun if-false-case (expression) (fourth expression))
;;; Instantiate-per-reference says that its body may be copied.
;;; (instantiate-per-reference <instantiate-per-reference-body>)
(defun instantiate-per-reference-expression? (expression)
    (and (listp expression)
         (= (length expression) 2)
         (eq (first expression) 'instantiate-per-reference)))
(defun make-instantiate-per-reference (body)
    (list 'instantiate-per-reference body))
(defun instantiate-per-reference-body (expression) (second expression))
;;; Compute-statically says that computations in its body must be done at
;;; pe time.
;;; (compute-statically> <compute-statically-body)
(defun compute-statically-expression? (expression)
    (and (listp expression)
         (= (length expression) 2)
         (eq (first expression) 'compute-statically)))
(defun make-compute-statically (body)
    (list 'compute-statically body))
(defun compute-statically-body (expression) (second expression))
;;; Compute-aggressively says that computations in its body may be done at run
;;; time.
;;; (compute-aggressively <compute-aggressively-body>)
(defun compute-aggressively-expression? (expression)
    (and (listp expression)
         (= (length expression) 2)
         (eq (first expression) 'compute-agressively)))
(defun make-compute-agressively (body)
    (list 'compute-agressively body))
(defun compute-agressively-body (expression) (second expression))
;;; Known-value? is true if its body returns a constant or lambda at pe time.
;;; (known-value? <known-value-body>)
(defun known-value-expression? (expression)
    (and (listp expression)
         (=(length expression) 2)
         (eq (first expression) 'known-value?)))
(defun make-known-value (body)
    (list 'known-value? body))
(defun known-value-body (expression) (second expression))
;;; Known-case takes the true case if the test value is known at pe time to be
;;; of the form of the function applied to some arguments. Otherwise it takes
;;; the false case. If the true case is taken, it may reference arguments of
;;; the aplication via the formals.
;;; (known-case
;;;    <known-case-test-value (<known-case-function> . <known-case-formals>)
;;;    <known-case-true-case>
;;;    <known-case-false-case>)
(defun known-case-expression? (expression)
    (and (listp expression)
         (=(length expression) 5)
         (eq (first expression) 'known-case)
         (listp (third expression))
         (every #'symbolp (rest (third expression)))))
(defun make-known-case (test function formals true false)
    (list 'known-case test (cons function formals) true false))
(defun known-case-test-value (expression)
    (second expression))
(defun known-case-function (expression)
    (first (third expression)))
(defun known-case-formals (expression)
    (rest (third expression)))
(defun known-case-true-case (expression)
    (fourth expression))
(defun known-case-false-case (expression)
    (fifth expression))
;;; Static-override says that applications in the body known at pe time to be.
;;; applications of the value of variable may be replaced by applications of
;;; the override value, provided they are known at pe time to result in an
;;; accept form.
;; (static-override (<static-override-variable> <static-override-value>)
;;;     static-override-body)
(defun static-override-expression? (expression)
    (and (listp expression)
         (= (length expression) 3)
         (eq (first expression) 'static-override)
         (listp (second expression))
         (= (length (second expression)) 2)
         (symbolp (first (second expression)))))
(defun make-static-override (variable value body)
    (list 'static-override (list variable value) body))
(defun static-override-variable (expression) (first (second expression)))
(defun static-override-value (expression) (second (second expression)))
(defun static-override-body (expression) (third expression))
;;; Accept signals that a static override succeeded.
```

APPENDIX-continued

```
;;; (accept <accept-body>)
(defun accept-expression? (expression)
    (and (listp expression)
        (= (length expression) 2)
        (eq (first expression) 'accept)))
(defun make-accept (body)
    (list 'accept body))
(defun accept-body (expression) (second expression))
;;; ------------------------- PE data structures ---------------------
;;; The partial evaluator uses contexts to pass information downward
;;; and closures to pass information upward. It assumes
;;; constructors, modifiers, and accessors on contexts and closures.
;;; For each accessor there is a modifier, named by prepending
"override-" to
;;; the accessor name. The modifiers don't change the original closure
;;; or context, but rather return a new one with the specified field
;;; modified as described.
(defstruct context
    lexical-bindings           ; Pairs variables with bindings.
    override-bindings          ; Pairs unique identifiers with
                               ; sequences of alternatives.
    compute-statically)        ; Records whether we are in an
                               ; environment where computation
                               ; must be done at pe time.
(defun override-context-lexical-bindings (context new)
    (let ((copy (copy-copy-context context)))
        (setf (context-lexical-bindings copy) new)
        copy))
(defun override-context-override-bindings (context new)
    (let ((copy (copy-context context)))
        (setf (context-override-bindings copy) new)
        copy))
(defun override-context-compute-statically (context new)
    (let ((copy (copy-context context)))
        (setf (context-compute-statically copy) new)
        copy))
(defun empty-context ( )
    (make-context))
(defun lookup (variable bindings)
    (cdr (assoc variable bindings)))
(defun make-bindings (names values)
    (mapcar #'cons names values))
(defun nest-lexical-bindings (bindings context)
    (override-context-lexical-bindings
    context
    (append bindings (context-lexical-bindings context))))
;;; Add the specified alternatives in front of the ones for the context,
;;; removing any duplicate alternatives.
(defun merge-override-bindings (bindings context)
    (override-context-override-bindings
    context
    (let ((old-bindings (context-override-bindings context)))
        (let ((all-vars
            (union (mapcar #'first bindings)
                (mapcar #'first old-bindings))))
            (mapcar #'(lambda (var)
                (let ((front (lookup var bindings))
                    (back (lookup var old-bindings)))
                (cons
                    var
                    (append front
                        (remove-if #'(lambda (value)
                            (member value front
                                :test #'equal-closures?))
                        back)))))
                all-vars)))))
;;; Closures, as used here, record the results of a partial evaluation.
;;; Their expression will be a fully partial evaluated expression, whose
;;; subexpressions will themselves be closures. Lambda expressions are
an
;;; exception to this. As explained below, they are placed in closures
;;; before they are partial evaluated.
;;; The partial evaluator does a complete name conversion, so closures
do
;;; not have to record the lexical context, except for closures over
lambda
;;; expressions.
;;; A closure can either represent a computation of a value or a
reference
;;; to a value. It stores the expression in either case, so that the
;;; structure of the value can be consulted.
;;; Closures do, however, record a different kind of environment
;;; information. They record closures representing computations whose
;;; values may be accessed by reference closures in the expression
;;; inside. It is as if the expression is inside a let that makes all
of
;;; these closures available. Viewed that way, the expression of the
;;; closure is like the body of the let. Having the "body" available is
;;; important, because that holds the information that known-case gets
at.
(defstruct closure
    expression
    unique-identifier          ; An atom identifying a particular
                               ; computation. All references will
                               ; use the same atom
    required-closures          ; A list of the closures available
                               ; inside. Later closures in the
                               ; list can reference earlier ones
    local-expression-flag      ; True if this closure represents a
                               ; computation
    may-not-residualize        ; True if this closure was created
                               ; with in a compute-statically
    per-reference              ; True if the value has passed
                               ; through a per-reference form
    context)                   ; The lexical context. It is only
                               ; stored for closures over lambdas.
(defun override-closure-expression (closure new)
    (let ((copy (copy-closure closure)))
        10 (setf (closure-expression copy) new)
        copy))
(defun override-closure-unique-identifier (closure new)
    (let ((copy (copy-closure closure)))
        (setf (closure-unique-identifier copy) new)
        copy))
(defun override-closure-required-closures (closure new)
    (let ((copy (copy-closure closure)))
        (setf (closure-required-closures copy) new)
        copy))
(defun override-closure-local-expression-flag (closure new)
    (let ((copy (copy-closure closure)))
        (setf (closure-local-expression-flag copy) new)
        copy))
(defun override-closure-may-not-residualize (closure new)
    (let ((copy (copy-closure closure)))
        (setf (closure-may-not-residualize copy) new)
        copy))
(defun override-closure-per-reference (closure new)
    (let ((copy (copy-closure closure)))
        (setf (closure-per-reference copy) new)
        copy))
(defun override-closure-context (closure new)
    (let ((copy (copy-closure closure)))
        (setf (closure-context copy) new)
        copy))
;;; Return true if the closures are known to return the same value.
(defun equal-closures? (closure1 closure2)
    (or (eq (closure-unique-identifier closure1)
            (closure-unique-identifier closure2))
        (and (constant-expression? (closure-expression closure1))
            (constant-expression? (closure-expression closure2))
            (equal (closure-expression closure1)
                (closure-expression closure2)))))
;;; Package up an expression in a closure.
;;; To make sure computations don't get duplicated, everything gets name
;;; converted: The expression is assigned to a closure with a new unique
;;; identifier, and what is returned is a closure that is a reference to
that
;;; closure.
(defun make-expression-closure (expression context)
    (let ((identifier (gensym))
        (may-not-residualize (context-compute-statically context)))
        (make-closure :expression expression
            :local-expression-flag t
            :unique-identifier identifier
            :may-not-residualize may-not-residualize)))
;;; make a closure corresponding to an unbound variable.
(defun make-external-reference-closure (name)
    (make-closure :expression name
```

APPENDIX-continued

```
        :unique-identifier name))
;;; ----------------------- PE core --------------------------------
(defun fully-pe (expression)
   (convert-closure-to-expression
      (pe (expand expression) (empty-context))))
(defun pe (expression context)
   (cond
      ((constant-expression? expression)
       (pe-constant expression context))
      ((primop-expression? expression)
       (pe-primop expression context))
      ((lambda-expression? expression)
       (pe-lambda expression context))
      ((application-expression? expression)
       (pe-application expression context))
      ((variable-expression? expression)
       (pe-variable expression context))
      ((if-expression? expression)
       (pe-if expression context))
      ((instantiate-per-reference-expression? expression)
       (pe-instantiate-per-reference expression context))
      ((compute-statically-expression? expression)
       (pe-compute-statically expression context))
      ((compute-aggressively-expression? expression)
       (pe-compute-aggressively expression context))
      ((known-value-expression? expression)
       (pe-known-value expression context))
      ((known-case-expression? expression)
       (pe-known-case expression context))
      ((static-override-expression? expression)
       (pe-static-override expression context))
      ((accept-expression? expression)
       (pe-accept expression context))
      (t (error "Not a legal expression ~s" expression))))
(defun pe-list (list context)
   (mapcar #'(lambda (expression) (pe expression context))
      list)
(defun pe-constant (constant context)
   (make-expression-closure constant context))
(defun pe-primop (primop context)
   (let ((operator (primop-operator primop))
         (arguments (pe-list (primop-arguments primop) context)))
      (make-expression-closure
         (cond
            ((every #'(lambda (argument)
                  (constant-expression? (closure-expression argument)))
               arguments)
             (apply-primitive operator (mapcar #'closure-expression arguments)))
            ((and (eq operator 'equal)
                  (= (length arguments) 2)
                  (equal-closures (first arguments) (second arguments)))
             *true*)
            (t (make-primop operator arguments)))
         context)))
;;; Since a reference to a lambda expression may provide overriding
;;; information about its environment, and earlier partial evaluation may
;;; make it impossible to use that information, lambda expressions are not
;;; partial evaluated until needed for final code generation. Thus
;;; lambda expression closures, and only such closures, will contain
;;; unevaluated expressions, and will record a context.
(defun pe-lambda (lambda context)
   (override-closure-context
      (make-expression-closure lambda context)
      context))
;;; Really PE the body of the lambda expression, for purposes of code
;;; generation.
;;; Since we are doing code gen, this returns an expression, not a closure.
(defun really-pe-lambda (lambda context)
   (let ((body (lambda-body lambda))
         (formals (lambda-formals lambda)))
      (let ((dummies (mapcar #'(lambda (formal)
                        (convert-closure-to-reference
                           (make-expression-closure 'dummy context)))
                        formals)))
         (make-lambda (mapcar #'closure-unique-identifier dummies)
            (pe
               body
               (nest-lexical-bindings
                  (make-bindings formals dummies)
                  (override-context-compute-statically
                     context
                     nil)))))
(defun pe-application (application context)
   (let ((function (pe (application-function application) context))
         (arguments (pe-list (application-arguments application) context)))
      (or
         ;; Try any static overrides.
         (some #'(lambda (alternative)
               (let ((answer (do-apply alternative arguments context)))
                  (when (accept-expression? (closure-expression answer))
                     (in-available-closures
                        (closure-required-closures answer)
                        (accept-body (closure-expression answer))))))
            (lookup (closure-unique-identifier function)
               (context-override-bindings context)))
         ;; Unfold if the function is a local lambda expression
         (when (and (lambda-expression? (closure-expression function))
                  (or (closure-local-expression-flag function)
                     (closure-per-reference function)))
            (do-apply function arguments context))
         ;; Build a residual application. Since the arguments might be
         ;; extracted by multiple known-cases, make them shared.
         (with-shared-values arguments
            #'(lambda (transformed-arguments)
               (make-expression-closure
                  (make-application function transformed-arguments)
                  context))))))
(defun do-apply (function arguments context)
   (with-shared-values arguments
      #'(lambda (transformed-arguments)
         (in-available-closures
            (closure-required-closures function)
            (pe (lambda-body (closure-expression function))
               (nest-lexical-bindings
                  (make-bindings (lambda-formals (closure-expression function))
                     trans formed-arguments)
                  (override-context-compute-statically
                     (merge-override-bindings
                        (context-override-bindings context)
                        (closure-context function))
                     (context-compute-statically context))))))))
(defun pe-variable (variable context)
   (or (lookup variable (context-lexical-bindings context))
      (make-external-reference-closure variable)))
(defun pe-if (if context)
   (let ((test (pe (if-test if) context)))
      (if (constant-expression? (closure-expression test))
         (pe (if (eq (closure-expression test) *false*)
               (if-false-case if)
               (if-true-case if))
            context)
         (make-expression-closure
            (make-if test
               (pe (if-false-case if) context)
               (pe (if-true-case if) context))
            context))))
(defun pe-instantiate-per-reference (instantiate-per-reference context)
   (mark-per-reference
      (pe (instantiate-per-reference-body instantiate-per-reference)
         context)))
(defun pe-compute-statically (compute-statically context)
   (pe (compute-statically-body compute-statically)
      (override-context-compute-statically context t)))
(defun pe-compute-aggressively (compute-aggressively context)
   (pe (compute-aggressively-body compute-aggressively)
      (override-context-compute-aggressively context nil)))
(defun pe-known-value (known-value context)
   (let ((answer (pe (known-value-body known-value)
            (override-context-compute-statically context nil))))
      (make-expression-closure
         (if (or (constant-expression? (closure-expression answer))
               (lambda-expression? (closure-expression answer)))
            *true*
```

APPENDIX-continued

```
           *false*)
        context)))
(defun pe-known-case (known-case context)
   (let ((function (pe (known-case-function known-case) context))
         (formals (known-case-formals known-case))
         (test-value (pe (known-case-test-value known-case)
              (override-context-compute-statically context nil))))
      (if (let ((expression (closure-expression test-value)))
            (and (application-expression? expression)
                 (equal-closures? (application-function expression)
function)
                 (= (length (application-arguments expression))
                    (length formals))))
         (let ((arguments (application-arguments
                 (closure-expression test-value))))
            (in-available-closures
            (closure-required-closures test-value)
            (with-shared-values arguments
              #'(lambda (transformed-arguments)
                 (pe
                 (known-case-true-case known-case)
                 (nest-lexical-bindings
                    (make-bindings formals transformed-arguments)
                    context))))))
         (pe (known-case-false-case known-case) context))))
(defun pe-static-override (static-override context)
   (let ((variable (static-override-variable static-override))
         (alternative (pe (static-override-value static-override) context))
         (body (static-override-body static-override)))
      (let ((value (lookup variable (context-lexical-bindings context))))
         (if (null value)
            (error "attempt to override unbound variable" variable)
            (pe body
               (merge-override-bindings
                  (make-bindings (list (closure-unique-identifier value))
                       (list (list (mark-per-reference alternative))))
                  context))))))
(defun pe-accept (accept context)
   (let ((body (pe (accept-body accept) context)))
      (make-expression-closure (make-accept body) context)))
;;; ------------------------ PE utilities ----------------------------
---
(defun mark-per-reference (closure)
   (if (lambda-expression? (closure-expression closure))
         ;; per-reference only applies to lambda expressions
         (override-closure-per-reference closure t)
         closure))
(defun convert-closure-to-reference (closure)
   (override-closure-local-expression-flag
      (override-closure-required-closures
         closure
         nil)
      nil))
;;; The closures in a list are about to be shared inside a continuation
;;; computation. To avoid duplication of computation, we need to
promote
;;; them to available closures, and use references in place of them in
the
;;; continuation.
(defun with-shared-values (closures continuation)
   (in-available-closures
      closures
      (funcall continuation
         (mapcar #'convert-closure-to-reference closures))))
(defun in-available-closures (available closure)
   (reduce #'in-available-closure
      available
      :from-end t
      initial-value closure))
;;; A closure has been created, which may reference the closure or some
of
;;; its required required closures. Add all of the potential references
;;; the required closures list. Also, flatten out any nesting of
required
;;; closures, so that closures in the list don't, themselves, have
required
;;; closures.
(defun in-available-closure (available closure)
   (cond ((closure-required-closures available)
         (in-available-closures
            (closure-required-closures available)
            (in-available-closure
               (override-closure-required-closures available nil)
               closure)))
         ((closure-local-expression-flag available)
            (override-closure-required-closures
            closure
            (cons available (closure-required-closures closure))))
         (t closure)))
;;; Convert a closure to an expression. This is where lambda
expressions
;;; are actually partial evaluated, as it is known that the lambda will
;;; actually be needed in the output code.
(defun convert-closure-to-expression (closure)
   (if (and (closure-may-not-residualize closure)
         (or (closure-local-expression-flag closure)
            (closure-per-reference closure))
         (not (constant-expression? (closure-expression closure))))
      (error "unable to execute static expression at pe time ~S"
         (closure-expression closure))
      (wrap-in-required-bindings
         (closure-required-closures closure)
         (if (or (closure-local-expression-flag closure)
               (closure-per-reference closure))
            (map-subclosures
               #'convert-closure-to-expression
               (let ((expression (closure-expression closure)))
                  (if (lambda-expression? expression)
                     (really-pe-lambda
                        expression
                        (closure-context closure))
                     expression)))
            (closure-unique-identifier closure)))))
(defun map-subclosures (function thing)
   (cond ((typep thing 'closure)
         (funcall function thing))
         ((listp thing)
            (mapcar #'(lambda (element)
               (map-subclosures function element))
               thing))
         (t thing)))
(defun wrap-in-required-bindings (available expression)
   (reduce #'wrap-in-required-binding
      available
      :from-end t
      initial-value expression))
(defun wrap-in-required-binding (available expression)
   (if (occurs-free-in? (closure-unique-identifier available) expression)
      `(let ((,(closure-unique-identifier available)
            (convert-closure-to-expression available)))
         ,expression)
      expression))
(defun occurs-free-in? (symbol expression)
   ;; cheat on checking bound variables, because we will always be
checking
   ;; for unique identifiers.
   (or (eq symbol expression)
      (and (listp expression)
         (some #'(lambda (sub-expression)
               (occurs-free-in? symbol sub-expression))
            expression))))
;;; expand out non-primitive forms (currently just let)
(defun expand (expression)
   (if (listp expression)
      (if (eq (first expression) 'let)
         (if (and (= (length expression) 3)
               (listp (second expression))
               (every #'(lambda (binding)
                  (and (listp binding)
                     (= (length binding) 2)
                     (symbolp (first binding))))
                  (second expression)))
            (let ((bindings (second expression))
                  (body (third expression)))
               (cons (list 'lambda (mapcar #'car bindings) (expand body))
                  (mapcar #'expand (mapcar #'second bindings)))))
```

APPENDIX-continued (error "Illegal let expression ~s" expression))
(mapcar #'expand expression))
expression))

What is claimed is:

1. A method of processing a computer program, the program having a plurality of procedures therein, comprising the step of:

providing in the program a language construct that specifies that a specialization of a selected procedure should be created at a predetermined point of use of the selected procedure, thereby allowing the selected procedure associated with the language construct to be evaluated before the program is run while a procedure in the program that is not a selected procedure is evaluated at runtime, the providing step including the steps of identifying an expression in the program having the language construct associated therewith;

deriving a value associated with the expression;

returning a copy of the expression having the language construct associated therewith at a point in the program where the value of the expression has the language construct associated therewith.

2. A method of processing a computer program to be compiled and run, the program having a plurality of computations associated therewith, comprising the steps of:

providing in the program a language construct that specifies that a selected computation in the program associated with the language construct should be carried out before the program is run;

submitting the program to a partial evaluator before the program is compiled; and returning an error if the selected computation having the language construct associated therewith cannot be done by the partial evaluator.

3. The method of claim 2, further comprising the step of requiring every expression in the program following the expression having the language construct associated therewith to be computed by the partial evaluator.

4. The method of claim 3, further comprising the step of requiring every expression in the program following the expression having the language construct associated therewith to be computed by the partial evaluator, until a predetermined instruction is identified in the program which instructs that no further expressions in the program shall be computed by the partial evaluator.

5. A method of processing a computer program, the program including a plurality of expressions, comprising the steps of:

submitting a selected expression in the program to a partial evaluator before the program is run;

if the partial evaluator determines a value which can be substituted for the expression without changing the result of the program, returning to the program a first language construct, and otherwise returning to the program a second language construct.

6. The method of claim 5, the returning step including the step of returning a true flag if the expression can be reduced to a constant at partial evaluation time, and returning a false flag if the expression cannot be reduced to a constant at partial evaluation time, the flag replacing the expression in the program.

7. A method of processing a computer program, the program defining therein a plurality of expressions, comprising the steps of:

submitting a selected expression in the program to a partial evaluator before the program is run;

if the partial evaluator determines that the expression is the result of invoking the specific procedure, the partial evaluator returning to the program a first language construct, otherwise returning to the program a second language construct.

8. The method of claim 7, the returning step including the steps of simplifying the expression to a function having a number of arguments associated therewith;

if the number of arguments associated with the function is a predetermined number, returning to the program the first language construct, otherwise returning to the program the second language construct.

9. The method of claim 8, the function having variables and arguments associated therewith, and further including the step of evaluating the function where the variables in the function are bound to arguments in the function.

* * * * *

UNITED STATES PATENT AND TRADEMARK OFFICE
CERTIFICATE OF CORRECTION

| | |
|---|---|
| PATENT NO. | : 6,199,201 B1 |
| APPLICATION NO. | : 09/128685 |
| DATED | : March 6, 2001 |
| INVENTOR(S) | : John O. Lamping et al. |

Page 1 of 1

It is certified that error appears in the above-identified patent and that said Letters Patent is hereby corrected as shown below:

Column 1, line 4, insert as a new paragraph:

This invention was made with Government support under 70NANB5H1026 awarded by DoC / NIST. The Government has certain rights in this invention.

Signed and Sealed this

Eleventh Day of November, 2008

JON W. DUDAS
*Director of the United States Patent and Trademark Office*